(12) United States Patent
Zhang et al.

(10) Patent No.: US 8,886,799 B1
(45) Date of Patent: Nov. 11, 2014

(54) IDENTIFYING A SIMILAR USER IDENTIFIER

(75) Inventors: Xincheng Zhang, Sunnyvale, CA (US); Jia Liu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 13/598,331

(22) Filed: Aug. 29, 2012

(51) Int. Cl.
*G06F 15/16* (2006.01)
*G06F 12/00* (2006.01)

(52) U.S. Cl.
USPC .......................................... 709/224; 709/218

(58) Field of Classification Search
CPC .............. G06Q 30/02; G06Q 30/0201; G06Q 30/0254; G06Q 30/0277; G06Q 50/01; G06Q 10/10; G06Q 30/0241; G06Q 30/0243; G06Q 30/0244; G06Q 30/0246; G06Q 30/0247; G06Q 30/0255; G06Q 30/0269; G06Q 30/27
USPC ........................... 790/223–229, 217–219, 250
See application file for complete search history.

(56) References Cited

U.S. PATENT DOCUMENTS

| | | | |
|---|---|---|---|
| 5,901,255 A | 5/1999 | Yagasaki | |
| 5,974,398 A | 10/1999 | Hanson et al. | |
| 6,185,514 B1 | 2/2001 | Skinner et al. | |
| 6,266,649 B1 | 7/2001 | Linden et al. | |
| 6,269,351 B1 | 7/2001 | Black | |
| 6,295,504 B1 | 9/2001 | Ye et al. | |
| 6,487,538 B1 | 11/2002 | Gupta et al. | |
| 6,539,375 B2 | 3/2003 | Kawasaki | |
| 6,560,578 B2 | 5/2003 | Eldering | |
| 6,567,797 B1 | 5/2003 | Schuetze et al. | |
| 6,598,054 B2 | 7/2003 | Schuetze et al. | |
| 6,973,436 B1 | 12/2005 | Shkedi | |
| 6,982,726 B1 | 1/2006 | Berestov | |
| 7,003,566 B2 | 2/2006 | Codella et al. | |
| 7,103,584 B2 | 9/2006 | Lee | |
| 7,202,791 B2 | 4/2007 | Trajkovic | |
| 7,203,909 B1 | 4/2007 | Horvitz et al. | |
| 7,257,546 B2 | 8/2007 | Ebrahimi et al. | |
| 7,272,065 B2 | 9/2007 | Lovett | |
| 7,454,705 B2 | 11/2008 | Cadez et al. | |
| 7,685,278 B2 | 3/2010 | Cohen et al. | |
| 7,693,836 B2 | 4/2010 | Brave et al. | |
| 7,693,863 B2 | 4/2010 | Martin et al. | |
| 7,711,735 B2 | 5/2010 | Wu et al. | |
| 7,734,632 B2 | 6/2010 | Wang | |
| 7,739,314 B2 | 6/2010 | Datar et al. | |
| 7,769,786 B2 | 8/2010 | Patel | |
| 7,822,636 B1 | 10/2010 | Ferber et al. | |
| 7,882,175 B1 | 2/2011 | Nayfeh et al. | |

(Continued)

OTHER PUBLICATIONS

Notice of Allowance on U.S. Appl. No. 13/462,130 dated Apr. 22, 2013.

(Continued)

*Primary Examiner* — Zarni Maung
(74) *Attorney, Agent, or Firm* — Foley & Lardner LLP; John D. Lanza (57) ABSTRACT

Systems and methods for identifying a similar user identifier include analyzing history data indicative of webpages visited by a set of user identifiers. A product category corresponding to a specific manufacturer or a specific product from the manufacturer may be identified using the history data and associated with the set of user identifiers. A user identifier may be identified as being similar to those in the set based in part on the user identifier also being associated with the product category.

20 Claims, 5 Drawing Sheets

(56) References Cited

U.S. PATENT DOCUMENTS

| | | | |
|---|---|---|---|
| 7,904,448 B2 | 3/2011 | Chung et al. | |
| 8,026,944 B1 | 9/2011 | Sah | |
| 8,027,964 B2 | 9/2011 | Boulis | |
| 8,095,484 B2 | 1/2012 | Cheng et al. | |
| 8,095,523 B2 | 1/2012 | Brave et al. | |
| 8,117,211 B2 | 2/2012 | Yamamoto et al. | |
| 8,131,733 B2 | 3/2012 | Wang | |
| 8,260,656 B1 | 9/2012 | Harbick et al. | |
| 8,321,934 B1 | 11/2012 | Cooley et al. | |
| 8,370,321 B2 | 2/2013 | Chu et al. | |
| 8,527,526 B1* | 9/2013 | Liu et al. | 707/751 |
| 8,566,422 B2* | 10/2013 | Johnson et al. | 709/218 |
| 2003/0033196 A1 | 2/2003 | Tomlin | |
| 2003/0220975 A1 | 11/2003 | Malik | |
| 2004/0030667 A1 | 2/2004 | Xu et al. | |
| 2004/0090472 A1 | 5/2004 | Risch et al. | |
| 2004/0215509 A1 | 10/2004 | Perry | |
| 2005/0049907 A1 | 3/2005 | Kumar et al. | |
| 2005/0086105 A1 | 4/2005 | McFadden et al. | |
| 2006/0015487 A1 | 1/2006 | Vest | |
| 2006/0026062 A1 | 2/2006 | Collins | |
| 2006/0059144 A1 | 3/2006 | Canright et al. | |
| 2006/0069612 A1 | 3/2006 | Hurt et al. | |
| 2006/0069616 A1 | 3/2006 | Bau | |
| 2006/0136294 A1 | 6/2006 | Linden et al. | |
| 2006/0241923 A1 | 10/2006 | Xu et al. | |
| 2007/0061195 A1 | 3/2007 | Liu et al. | |
| 2007/0067297 A1 | 3/2007 | Kublickis | |
| 2007/0073579 A1 | 3/2007 | Immorlica et al. | |
| 2007/0130005 A1 | 6/2007 | Jaschke | |
| 2007/0156519 A1 | 7/2007 | Agassi et al. | |
| 2007/0179846 A1 | 8/2007 | Jain et al. | |
| 2007/0233556 A1 | 10/2007 | Koningstein | |
| 2008/0071929 A1 | 3/2008 | Motte et al. | |
| 2008/0108308 A1 | 5/2008 | Ullah | |
| 2008/0126176 A1 | 5/2008 | Iguchi | |
| 2008/0140524 A1 | 6/2008 | Anand et al. | |
| 2008/0147659 A1 | 6/2008 | Chen et al. | |
| 2008/0154717 A1 | 6/2008 | Saifee et al. | |
| 2008/0189174 A1 | 8/2008 | Moore | |
| 2008/0201216 A1 | 8/2008 | Almeida | |
| 2008/0215348 A1 | 9/2008 | Guldimann et al. | |
| 2008/0294584 A1 | 11/2008 | Herz | |
| 2008/0300958 A1 | 12/2008 | Gluck | |
| 2009/0006974 A1 | 1/2009 | Harinarayan et al. | |
| 2009/0012852 A1 | 1/2009 | O'Kelley et al. | |
| 2009/0048925 A1 | 2/2009 | Song et al. | |
| 2009/0077495 A1 | 3/2009 | Bhat et al. | |
| 2009/0164274 A1 | 6/2009 | Narayanaswamy et al. | |
| 2009/0164395 A1 | 6/2009 | Heck | |
| 2009/0222734 A1 | 9/2009 | Fuller et al. | |
| 2009/0228397 A1 | 9/2009 | Tawakol et al. | |
| 2009/0248494 A1 | 10/2009 | Hueter et al. | |
| 2009/0265243 A1 | 10/2009 | Karassner et al. | |
| 2009/0281923 A1 | 11/2009 | Selinger et al. | |
| 2009/0292386 A1 | 11/2009 | Cheng et al. | |
| 2009/0327032 A1 | 12/2009 | Gunawardana et al. | |
| 2010/0004975 A1 | 1/2010 | White et al. | |
| 2010/0042500 A1 | 2/2010 | Pritchard et al. | |
| 2010/0042502 A1 | 2/2010 | Farmanfarmaian et al. | |
| 2010/0082421 A1 | 4/2010 | Tuladhar et al. | |
| 2010/0121850 A1 | 5/2010 | Moitra et al. | |
| 2010/0131835 A1 | 5/2010 | Kumar et al. | |
| 2010/0138291 A1 | 6/2010 | Silverman et al. | |
| 2010/0169342 A1 | 7/2010 | Kenedy et al. | |
| 2010/0217648 A1 | 8/2010 | Agarwal et al. | |
| 2010/0228614 A1 | 9/2010 | Zhang et al. | |
| 2010/0235241 A1 | 9/2010 | Wang et al. | |
| 2010/0250558 A1 | 9/2010 | Wang | |
| 2010/0274753 A1 | 10/2010 | Liberty et al. | |
| 2010/0293057 A1 | 11/2010 | Haveliwala et al. | |
| 2010/0318374 A1 | 12/2010 | Flake et al. | |
| 2010/0325666 A1 | 12/2010 | Wiser et al. | |
| 2011/0010324 A1 | 1/2011 | Bolivar et al. | |
| 2011/0055008 A1 | 3/2011 | Feuerstein et al. | |
| 2011/0055012 A1 | 3/2011 | Christianson et al. | |
| 2011/0071900 A1 | 3/2011 | Kamath et al. | |
| 2011/0077998 A1 | 3/2011 | Yan et al. | |
| 2011/0106796 A1* | 5/2011 | Svaic | 707/728 |
| 2011/0145248 A1 | 6/2011 | Doliov | |
| 2011/0153423 A1 | 6/2011 | Elvekrog et al. | |
| 2011/0166926 A1 | 7/2011 | Lv et al. | |
| 2011/0173198 A1 | 7/2011 | Malleshaiah et al. | |
| 2011/0191176 A1 | 8/2011 | Merriman et al. | |
| 2011/0191714 A1 | 8/2011 | Ting et al. | |
| 2011/0225608 A1 | 9/2011 | Lopatecki et al. | |
| 2011/0231241 A1 | 9/2011 | Kesari et al. | |
| 2011/0231257 A1 | 9/2011 | Winters | |
| 2011/0231264 A1 | 9/2011 | Dilling et al. | |
| 2011/0246267 A1 | 10/2011 | Williams et al. | |
| 2011/0258039 A1 | 10/2011 | Patwa et al. | |
| 2011/0264522 A1 | 10/2011 | Chan et al. | |
| 2011/0270560 A1 | 11/2011 | Wang et al. | |
| 2011/0288937 A1 | 11/2011 | Manoogian et al. | |
| 2012/0010939 A1 | 1/2012 | Krishnamoorthy et al. | |
| 2012/0047013 A1 | 2/2012 | Bigby et al. | |
| 2012/0047022 A1 | 2/2012 | Shamim et al. | |
| 2012/0047132 A1 | 2/2012 | Fleming et al. | |
| 2012/0059707 A1 | 3/2012 | Goenka et al. | |
| 2012/0166530 A1 | 6/2012 | Tseng | |
| 2012/0179543 A1 | 7/2012 | Luo et al. | |
| 2012/0209568 A1 | 8/2012 | Arndt et al. | |
| 2012/0253928 A1 | 10/2012 | Jackson et al. | |
| 2012/0271782 A1 | 10/2012 | Blowers et al. | |
| 2012/0316972 A1 | 12/2012 | Hu et al. | |
| 2013/0006778 A1 | 1/2013 | Raghunandan | |
| 2013/0047076 A1 | 2/2013 | McElfresh et al. | |
| 2013/0054628 A1 | 2/2013 | Meierhoefer et al. | |
| 2013/0124259 A1* | 5/2013 | Chourey et al. | 705/7.29 |
| 2013/0132415 A1 | 5/2013 | Adams | |
| 2013/0151312 A1* | 6/2013 | Logan | 705/7.31 |

OTHER PUBLICATIONS

Office Action on U.S. Appl. No. 13/362,671 dated May 8, 2013.
Office Action on U.S. Appl. No. 13/362,797 dated Apr. 24, 2013
Office Action on U.S. Appl. No. 13/462,630 dated May 8, 2013.
Office Action on U.S. Appl. No. 13/550,073 dated Jun. 3, 2013.
U.S. Appl. No. 13/362,671, filed Jan. 31, 2012, Liu et al.
U.S. Appl. No. 13/362,797, filed Jan. 31, 2012, Liu et al.
U.S. Appl. No. 13/362,910, filed Jan. 31, 2012, Liu et al.
U.S. Appl. No. 13/460,411, filed Apr. 30, 2012 Liu et al.
U.S. Appl. No. 13/460,469, filed Apr. 30, 2012, Liu et al.
U.S. Appl. No. 13/462,130, filed May 2, 2012, Liu et al.
U.S. Appl. No. 13/462,425, filed May 2, 2012, Liu et al.
U.S. Appl. No. 13/462,509, filed May 2, 2012, Liu et al.
U.S. Appl. No. 13/465,679, filed May 7, 2012, Goel et al.
U.S. Appl. No. 13/465,730, filed May 7, 2012, Liu et al.
U.S. Appl. No. 13/465,762, filed May 7, 2012, Liu et al.
U.S. Appl. No. 13/476,532, filed May 21, 2012, Liu et al.
U.S. Appl. No. 13/534,480, filed Jun. 27, 2012, Liu et al.
U.S. Appl. No. 13/550,073, filed Jul. 16, 2012, Liu et al.
U.S. Appl. No. 13/551,236, filed Jul. 17, 2012, Liu et al.
Bhat et al., Dynamic Real-Time Targeting Through Variable-Length Behavioral History, Apr. 18, 2009, © 2009 Microsoft, 4 pages.
"Clustering II" Powerpoint, EECS435, Spring 2008, 25 pages.
http://en.wikipedia.org/wiki/Cluster_analysis; "Cluster Analysis", Wikipedia.org, retrieved Jan. 27, 2012, 15 pages.
http://en.wikipedia.org/wiki/Logistic_regression; "Logistic Regression", Wikipedia.org, retrieved Apr. 2, 2012, 14 pages.
Johnson, Confidence Intervals on Likelihood Estimates for Estimating Association Strengths, Brown University, Draft of May 28, 1999, 7 pages.
Renals, Classification and Nearest Neighbours; Informatics 2B: Learning and Data Lecture 4, Jan. 28, 2011, 27 pages.
support.google.com/adwords/bin/answer.py?hl=en&answer=1209882; "Where Your Ad Can Appear on the Display Network Depending on Your Targeting Methods", support.google.com, retrieved Apr. 16, 2012, 4 pages.
support.google.com/adwords/bin/answer.py?hl=en&answer=171271; "How Do I Create a Custom Combination List?", support.google.com, retrieved Apr. 16, 2012, 3 pages.

(56) References Cited

OTHER PUBLICATIONS www.techterms.com/definition/rpm; "RPM", © 2012 TechTerms.com, retrieved Apr. 9, 2012, 1 page.
U.S. Appl. No. 13/462,425, filed May 2, 2012.
U.S. Appl. No. 13/460,327, filed Apr. 30, 2012.
U.S. Appl. No. 13/460,411, filed Apr. 30, 2012.
U.S. Appl. No. 13/462,509, filed May 2, 2012.
U.S. Appl. No. 13/460,469, filed Apr. 30, 2012.
U.S. Appl. No. 13/465,730, filed May 7, 2012.
U.S. Appl. No. 13/362,910, filed Jan. 31, 2012.
U.S. Appl. No. 13/462,630, filed May 2, 2012.
U.S. Appl. No. 13/602,059, filed Aug. 31, 2012.
U.S. Appl. No. 13/601,775, filed Aug. 31, 2012.
U.S. Appl. No. 13/465,762, filed May 7, 2012.
U.S. Appl. No. 13/465,679, filed May 7, 2012.
U.S. Appl. No. 13/362,671, filed Jan. 31, 2012.
U.S. Appl. No. 13/363,353, filed Jan. 31, 2012.
U.S. Appl. No. 13/363,356, filed Jan. 31, 2012.
U.S. Appl. No. 13/534,480, filed Jun. 27, 2012.
U.S. Appl. No. 13/551,236, filed Jul. 17, 2012.
U.S. Appl. No. 13/476,532, filed May 21, 2012.
U.S. Appl. No. 13/550,073, filed Jul. 16, 2012.
U.S. Appl. No. 13/462,130, filed May 2, 2012.
U.S. Appl. No. 13/362,797, filed Jan. 31, 2012.
U.S. Appl. No. 13/460,327, filed Apr. 30, 2012, Jia Liu et al.
U.S. Appl. No. 13/462,630, filed May 2, 2012, Jia Liu et al.
U.S. Appl. No. 13/601,775, filed Aug. 31, 2012, Jia Liu et al.
U.S. Appl. No. 13/602,059, filed Aug. 31, 2012, Jia Liu et al.
Notice of Allowance on U.S. Appl. No. 13/551,236 dated Jan. 30, 2014.
Office Action on U.S. Appl. No. 13/362,671 dated Dec. 31, 2013.
Office Action on U.S. Appl. No. 13/362,910 dated Sep. 11, 2013.
Office Action on U.S. Appl. No. 13/363,356 dated Mar. 14, 2014.
Office Action on U.S. Appl. No. 13/462,425 dated Mar. 12, 2014.
Office Action on U.S. Appl. No. 13/462,509 dated Dec. 27, 2013.
Office Action on U.S. Appl. No. 13/462,630 dated Jan. 14, 2014.
Office Action on U.S. Appl. No. 13/465,762 dated Jan. 16, 2014.
Office Action on U.S. Appl. No. 13/476,532 dated Dec. 30, 2013.
Office Action on U.S. Appl. No. 13/550,073 dated Oct. 22, 2013.
Office Action on U.S. Appl. No. 13/550,073 dated Feb. 10, 2014.
US Non Final OA on U.S. Appl. No. 13/363,353 dated Apr. 22, 2014.
US Non Final Office Action on U.S. Appl. No. 13/465,679 dated Apr. 14, 2014.
US Office Action on U.S. Appl. No. 13/362,910 dated Apr. 8, 2014.
Notice of Allowance on U.S. Appl. No. 13/551,236 dated May 22, 2014.

* cited by examiner

IDENTIFYING A SIMILAR USER IDENTIFIER

BACKGROUND

The present disclosure relates generally to analyzing user identifiers. More specifically, the present disclosure relates to using product categories to identify a user identifier as being similar to one or more other user identifiers.

Online content may be available regarding any number of disparate topics. For example, a first website on the Internet may be devoted to the migratory habits of bats and a second website may be devoted to automotive repair. In many cases, a user must proactively seek out online content of interest to the user. For example, an Internet user may utilize a search engine to search for webpages devoted to automotive repair. The user may then navigate between the webpages in the search results until the user finds the webpage that most closely matches the user's interests.

SUMMARY

Implementations of the systems and methods for identifying a similar user identifier are disclosed herein. One implementation is a method for identifying a similar user identifier. The method includes receiving, at a processing circuit, history data indicative of webpages visited by a set of user identifiers. The method also includes analyzing, by the processing circuit, the history data to identify a product category based in part on a topic of the webpages, the product category corresponding to a specific manufacturer or a specific product from the manufacturer. The method further includes associating, by the processing circuit, the product category with the user identifiers in the set. The method yet further includes identifying, by the processing circuit, a user identifier as being a similar user identifier to the user identifiers in the set based in part on a product category associated with the user identifier and based in part on the product category associated with the user identifiers in the set. The method also includes providing, by the processing circuit, an indication of the similar user identifier.

Another implementation is a system for identifying a similar user identifier. The system includes a processing circuit operable to receive history data indicative of webpages visited by a set of user identifiers. The processing circuit is also operable to analyze the history data to identify a product category based in part on a topic of the webpages, the product category corresponding to a specific manufacturer or a specific product from the manufacturer. The processing circuit is further operable to associate the product category with the user identifiers in the set. The processing circuit is yet further operable to identify a user identifier as being a similar user identifier to the user identifiers in the set based in part on a product category associated with the user identifier and based in part on the product category associated with the user identifiers in the set. The processing circuit is also operable to provide an indication of the similar user identifier.

A further implementation is a computer-readable storage medium having machine instructions stored therein, the instructions being executable by a processor to cause the processor to perform operations. The operations include receiving history data indicative of webpages visited by a set of user identifiers. The operations also include analyzing the history data to identify a product category based in part on a topic of the webpages, the product category corresponding to a specific manufacturer or a specific product from the manufacturer. The operations further include associating the product category with the user identifiers in the set. The operations additionally include identifying a user identifier as being a similar user identifier to the user identifiers in the set based in part on a product category associated with the user identifier and based in part on the product category associated with the user identifiers in the set. The operations also include providing an indication of the similar user identifier.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, first-party and third-party content may be provided to a client device. As used herein, first-party content refers to the primary online content requested or displayed by the client device. For example, first-party content may be a webpage requested by the client or a stand-alone application (e.g., a video game, a chat program, etc.) running on the device. Third-party content, in contrast, refers to additional content that may be provided in conjunction with the first-party content. For example, third-party content may be a public service announcement or advertisement that appears in conjunction with a requested webpage (e.g., a search result webpage from a search engine, a webpage that includes an online article, a webpage of a social networking service, etc.) or within a stand-alone application (e.g., an advertisement within a game). Generally, a first-party content provider is a content provider that allows another content provider (i.e., a third-party content provider) to provide content in conjunction with that of the first-party. The first-party content provider may or may not be compensated for allowing a third-party provider to provide content with the first-party provider's content. For example, the first-party provider may receive compensation for allowing certain paid public service announcements or advertisements to be provided in conjunction with the first-party provider's content.

A first-party content provider may allow a content selection service to determine which third-party content is to be provided in conjunction with the first-party provider's content. One or more third-party content providers may also use the content selection service to provide third-party content in conjunction with content from any number of first-party providers. In some cases, the content selection service may dynamically select which third-party content is presented in conjunction with a first-party provider's content. For example, a first-party webpage may display different third-party content during different visits to the webpage. The content selection service may determine which third-party content is to be provided based on any number of factors (e.g., whether the third-party content and first-party content relate to the same topic). For example, a third-party advertisement for golf clubs may appear on a webpage devoted to reviews of golf resorts. The content selection service may also conduct a content auction to select the third-party content to be provided from among the various third-party content providers.

According to various implementations, a content selection service may be configured to select third-party content based on its potential relevance to a particular user. With the user's permission, the content selection service may represent the user as an anonymized user identifier. In general, a user identifier refers to any form of data that may be used to represent a user. In one implementation, a user identifier may be a client identifier that represents the user's client device to the content selection service. A client identifier may be, but is not limited to, a cookie set on the client device, a hardware-based identifier for the client device, a universally unique identifier (UUID) for an application installed on the client device, or a telephone number for the client device. In some implementations, a user identifier may be associated with one or more client identifiers. For example, a user identifier may be associated with a cookie set via the client device's web browser and a UUID for a game installed on the client device. Since the cookie and UUID are associated with the same user identifier, the content selection service may select third-party content for the client device, regardless of whether the third-party content is to be provided in conjunction with the game or a visited webpage.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by a content selection service and presented to the user. Certain data, such as a user identifier, may be anonymized in one or more ways before it is stored or used, so that personally identifiable information is removed when generating parameters (e.g., demographic parameters) used by the content selection service to select third-party content. For example, a user identifier may be anonymized so that no personally identifiable information about its corresponding user can be determined from it. In another example, a user's geographic location may be generalized where location information is obtained (such as to a city, ZIP code, or state level), so that a precise location of the user cannot be determined. Thus, the user may have control over how information is collected about him or her and used by the content selection service.

In some implementations, history data indicative of webpages visited by a user identifier may be analyzed by a content selection service to determine potential interests of the corresponding user. For example, the content selection service may receive history data for a user identifier that indicates that ten webpages devoted to golf were visited by the user identifier. In such a case, the content selection service may associate the user identifier with a golf-related interest category (e.g., by generating a database table entry that links the user identifier to the interest category). The content selection service may then select third-party content for the user identifier based in part on its associated interest category. For example, the content selection service may select third-party content related to golf to be presented in conjunction with a first-party webpage or application. Thus, the content selection service may select third-party content that may be of relevance to a particular user.

In further implementations, a content selection service may select third-party content for a user identifier based in part on a product category associated with the user identifier. Similar to interest categories, history data associated with a user identifier may be analyzed by the content selection service to identify a product category that may be of interest to a user. Generally, product categories differ from interest categories in that product categories relate to a specific manufacturer or a specific product from a manufacturer, instead of a generic type of product or service. For example, an interest category may be /Electronics/Mobile Devices/Cellular Telephones while a product category may be the "4G Supremo" phone manufactured by "Armadillo Mobile Devices." Thus, a product category may indicate a specific manufacturer and/or specific product from the manufacturer.

A content selection service may determine how similar the interests of a user are to a set of other users. In one implementation, the product categories and/or interest categories associated with a set of user identifiers may be compared to those of another user identifier, to determine whether the user identifier is similar to those in the set. In some cases, the set of user identifiers may be selected based on a type of online action associated with the user identifiers (e.g., a type of action indicated by the history data for the user identifiers in the set). For example, assume that user identifiers in the set visited a particular webpage and signed up for an online newsletter or made an online purchase after being provided third-party content. In such a case, a user identifier associated with similar product categories and/or interest categories in the set may also be more likely to sign up for the newsletter or make a purchase at the webpage, if provided the same third-party content. In other words, the content selection service may also select third-party content for a user identifier based in part on how other user identifiers having similar product categories and/or interest categories reacted to third-party content selected by the service.

Figure 1:
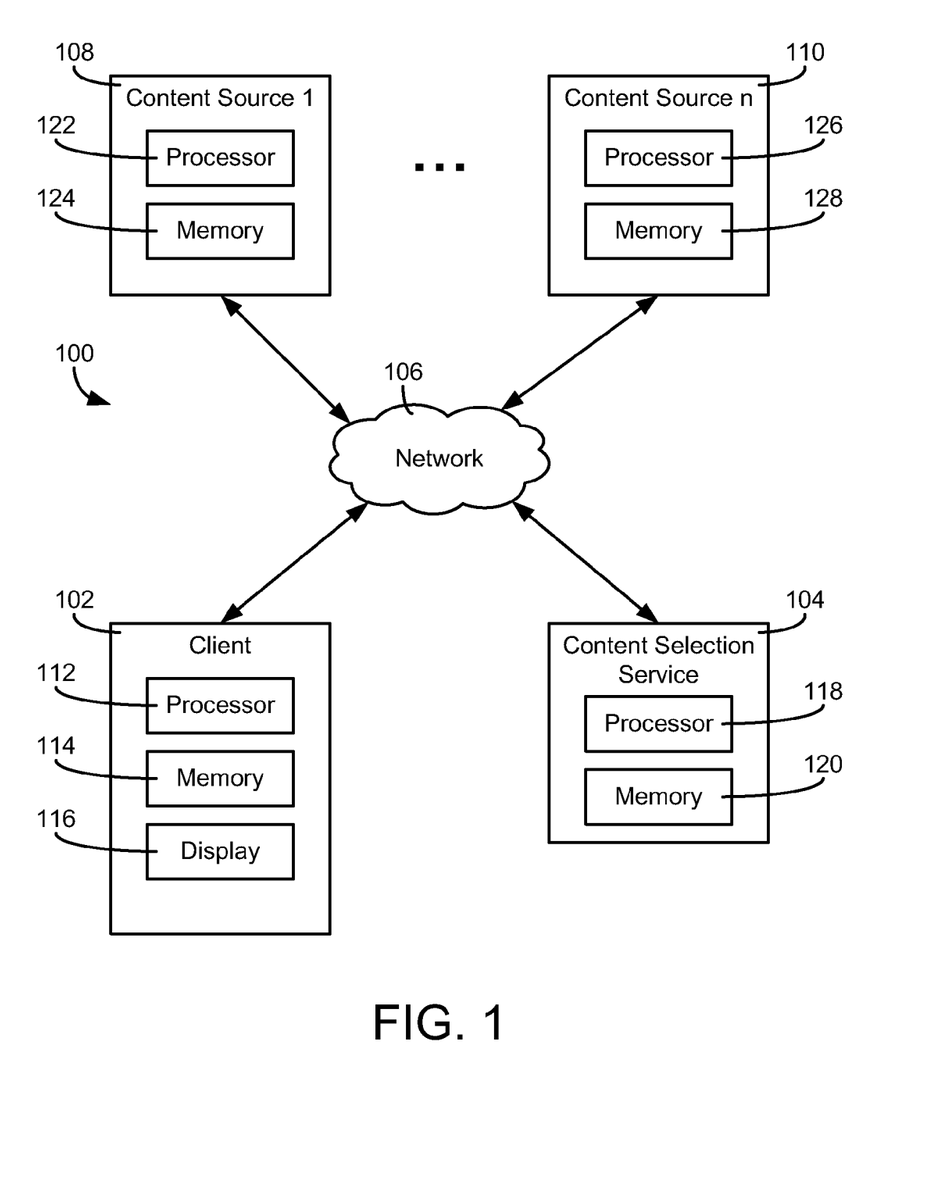
FIG. 1 is a block diagram of a computer system in accordance with a described implementation.

Referring to FIG. 1, a block diagram of a computer system 100 in accordance with a described implementation is shown. System 100 includes a client 102 which communicates with other computing devices via a network 106. Client 102 may execute a web browser or other application (e.g., a video game, a messenger program, a media player, a social networking application, etc.) to retrieve content from other devices over network 106. For example, client 102 may communicate with any number of content sources 108, 110 (e.g., a first content source through nth content source). Content sources 108, 110 may provide webpage data and/or other content, such as images, video, and audio, to client 102. Computer system 100 may also include a content selection service 104 configured to select content to be provided to client 102. For example, content source 108 may provide a first-party webpage to client 102 that includes additional third-party content selected by content selection service 104.

Network 106 may be any form of computer network that relays information between client 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). Client 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, and other forms of electronic documents. Similar to client 102, content sources 108, 110 may include processing circuits comprising processors 122, 126 and memories 124, 128, respectively, that store program instructions executable by processors 122, 126. For example, the processing circuit of content source 108 may include instructions such as web server software, FTP serving software, and other types of software that cause content source 108 to provide content via network 106.

According to various implementations, content sources 108, 110 may provide webpage data to client 102 that includes one or more content tags. In general, a content tag may be any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, content selection service 104, etc.), a network location (e.g., a URL) associated with clicking on the third-party content, how the third-party content is to be rendered on a display, a command that causes client 102 to set a browser cookie (e.g., via a pixel tag that sets a cookie via an image request), one or more keywords used to retrieve the third-party content, and other functions associated with providing third-party content with a first-party webpage. For example, content source 108 may provide webpage data that causes client 102 to retrieve third-party content from content selection service 104. In another implementation, content may be selected by content selection service 104 and provided by content source 108 as part of the first-party webpage data sent to client 102. In a further example, content selection service 104 may cause client 102 to retrieve third-party content from a specified location, such as memory 114 or content sources 108-110.

Similar to content sources 108, 110, content selection service 104 may be one or more electronic devices connected to network 106. Content selection service 104 may be a computer server (e.g., FTP servers, file sharing servers, web servers, etc.) or a combination of servers (e.g., a data center, a cloud computing platform, etc.). Content selection service 104 may have a processing circuit including a processor 118 and a memory 120 that stores program instructions executable by processor 118. In cases in which content selection service 104 is a combination of computing devices, processor 118 may represent the collective processors of the devices and memory 120 may represent the collective memories of the devices.

Content selection service 104 may be configured to select third-party content for client 102 (i.e., content selection service 104 may provide a third-party content selection service). In one implementation, the selected third-party content may be provided by content selection service 104 to client 102 via network 106. For example, content source 110 may upload the third-party content to content selection service 104. Content selection service 104 may then provide the third-party content to client 102 to be presented in conjunction with a first-party webpage provided by content source 108. In other implementations, content selection service 104 may provide an instruction to client 102 that causes client 102 to retrieve the selected third-party content (e.g., from memory 114 of client 102, from content source 110, etc.).

In some implementations, content selection service 104 may be configured to select content based on a user identifier associated with client 102. In general, a user identifier refers to any form of data that may be used to represent a user that has elected to receive content selected by content selection service 104. In some implementations, a user identifier may be associated with a client identifier that identifies client 102 to content selection service 104 or may itself be the client identifier. In some implementations, a user identifier may be associated with multiple client identifiers (e.g., a client identifier for a mobile device, a client identifier for a home computer, etc.). Client identifiers may include, but are not limited to, cookies, device serial numbers, user profile data, telephone numbers, or network addresses. For example, a cookie set on client 102 may be used to identify client 102 to content selection service 104.

Content selection service 104 may be configured to allow the user of client 102 to control which information about the user is collected and used by content selection service 104 via a user identifier. In addition, to the extent that content selection service 104 does collect and use information about the user, the data may be anonymized such that the user's identity cannot be determined by analyzing the collected data. In other words, the user of client 102 may control what types of information about the user is collected by content selection service 104 and how the information is used. In one embodiment, the user of client 102 may set one or more preferences (e.g., as part of an online profile) that control how content selection service 104 collects and uses information about the user. In another embodiment, content selection service 104 may set a cookie or other device identifier on client 102 that signifies that the user of client 102 has elected not to allow content selection service 104 to store information regarding him or her.

If the user of client 102 has elected to allow content selection service 104 to use information regarding him or her, content selection service 104 may use history data associated with a user identifier to select relevant content for the corresponding user. History data may be any data associated with a user identifier that is indicative of an online event (e.g., visiting a webpage, interacting with presented content, conducting a search, making a purchase, downloading content, etc.). Based in part on the analyzed history data, content selection service 104 may select third-party content to be provided in conjunction with first-party content (e.g., as part of a displayed webpage, as a pop-up, within a video game, within another type of application, etc.).

Content selection service 104 may analyze the history data associated with a user identifier to identify one or more topics that may be of interest. For example, content selection service 104 may perform text and/or image analysis on a webpage from content source 108, to determine one or more topics of the webpage. In some implementations, a topic may correspond to a predefined interest category used by content selection service 104. For example, a webpage devoted to the topic of golf may be classified under the interest category of sports. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category.

According to various implementations, content selection service 104 may analyze history data for a user identifier to identify one or more product categories. Similar to interest categories, a product category may be identified by content selection service 104 based on the content of a visited webpage, as indicated by the history data. In general, a product category refers to a specific product. For example, a product category may include data regarding the manufacturer of the product, the model of the product, the version of the product, and/or where the product is available for purchase. A product category differs from an interest category in that an interest category may represent a generic type of product, while a product category refers to a specific product. For example, an interest category may be /Electronics/Mobile Devices/Cellular Telephones while a product entity may be the "4G Supremo" phone manufactured by "Armadillo Mobile Devices." In one implementation, a product category may be a label that may be associated with one or more interest categories. A label key (e.g., a unique database table entry representing the product category) may be used in a database table entry with the user identifier and/or a key for the interest category, to associate the user identifier with the interest category and/or the product category. In another implementation, product categories may be grouped by content selection service 104 within a separate taxonomy from that of the interest categories. For example, the "4G Supremo" phone may be categorized under /Electronics/Mobile Devices/Manufacturers/Armadillo Mobile Devices/4G Supremo. In a further implementation, product categories may not conform to a hierarchy at all and a label key for the product category may be associated directly with a user identifier.

Content selection service 104 may receive history data indicative of one or more online events associated with a user identifier. In implementations in which a content tag causes client 102 to request content from content selection service 104, such a request may include a client identifier for client 102 and/or additional information (e.g., the webpage being loaded, the referring webpage, etc.). Content selection service 104 may store such data to record a history of online events associated with a user identifier. In some cases, client 102 may provide history data to content selection service 104 without first executing a content tag. For example, client 102 may periodically send history data to content selection service 104 or may do so in response to receiving a command from a user interface device. In some implementations, content selection service 104 may receive history data from content sources 108, 110. For example, content source 108 may store history data regarding web transactions with client 102 and provide the history data to content selection service 104.

In some implementations, content selection service 104 may apply one or more weightings to an interest or product category, to determine whether the category is to be associated with a user identifier. For example, content selection service 104 may impose a maximum limit to the number of product or interest categories associated with a user identifier. The top n-number of categories having the highest weightings may then be selected by content selection service 104 to be associated with a particular user identifier. A category weighting may be based on, for example, the number of webpages visited by the user identifier regarding the category, when the visits occurred, how often the topic of the category was mentioned on a visited webpage, or any online actions performed by the user identifier regarding the category. For example, topics of more recently visited webpages may receive a higher weighting than webpages that were visited further in the past. Categories may also be subdivided by the time periods in which the webpage visits occurred. For example, the interest or product categories may be subdivided into long-term, short-term, and current categories, based on when the user identifier visited a webpage regarding the category.

Content selection service 104 may use identified interest categories and/or product categories for a user identifier to select third-party content for the user identifier. For example, a user identifier that is associated with a product category for the 4G Supremo mobile phone may receive third-party content about the phone or another mobile phone. Content selection service 104 may also use data regarding the actions of other user identifiers to select the third-party content for a user identifier. For example, assume that user identifiers that were presented third-party content regarding the 4G Supremo have a low rate of clicking on the third-party content. In such a case, content selection service 104 may select different third-party content for another user identifier also associated with the 4G Supremo-related product category.

In some cases, content selection service 104 may conduct a content auction among third-party content providers, to determine which third-party content is to be provided to a user identifier. For example, content selection service 104 may conduct a real-time content auction in response to client 102 requesting first-party content from one of content sources 108-110. Content selection service 104 may use any number of factors to determine the winner of the auction. For example, the winner of a content auction may be based in part on the third-party provider's bid, a quality score for the third-party content (e.g., a measurement of how frequently users interacted with the third-party content), how well the topic of the third-party content matches an interest category or product category associated with the user identifier, or how well a topic of the third-party content matches a topic of the first-party content.

According to various implementations, content selection service 104 may be configured to determine the similarity between a set of one or more user identifiers and another user identifier. Content selection service 104 may do so by analyzing history data for the user identifiers to identify one or more topical categories (e.g., product categories, interest categories, etc.) from webpages visited by the user identifiers. Based in part on a match between the categories associated with the set of user identifiers and that of another user identifier, the other user identifier may be determined by content selection service 104 to be a similar user identifier.

In one example, assume that a third-party content provider operates a website devoted to preventing the extinction of giant pandas. Also assume that the provider wishes to increase the number of users that are signed up for an online newsletter that gives updates on the conservation efforts. In such a case, the third-party content provider may provide a set of user identifiers to content selection service 104 that signed up for the newsletter. Content selection service 104 may then analyze history data for the user identifiers in the set to associate an interest or product category with the user identifiers. Based in part on another user identifier also being associated with the category, the other user identifier may be determined to be a similar user identifier. In such a case, content selection service 104 may provide an indication of the similar user identifier to the third-party content provider. The third-party content provider may then provide the third-party content to the similar user identifier. For example, the third-party content provider may place a bid in a content auction conducted by content selection service 104 for the ability to provide content to the similar user identifier.

Figure 2:
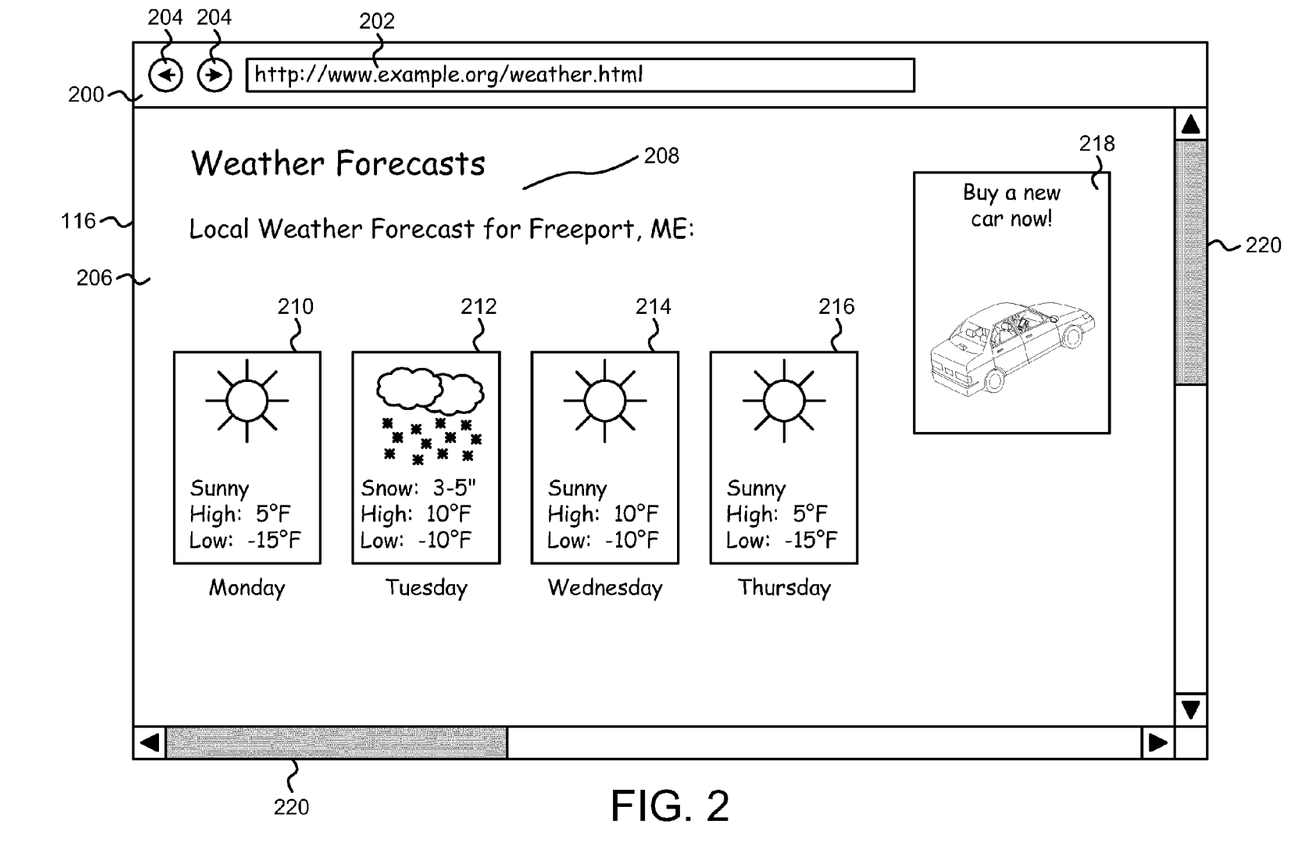
FIG. 2 is an illustration of an electronic display showing an example webpage.

Referring now to FIG. 2, an illustration is shown of electronic display 116 displaying an example webpage 206. Electronic display 116 is in electronic communication with processor 112 which causes visual indicia to be displayed on electronic display 116. As shown, processor 112 may execute a web browser 200 stored in memory 114 of client 102, to display indicia of content received by client 102 via network 106. In other implementations, another application executed by client 102 may incorporate some or all of the functionality described with regard to web browser 200 (e.g., a video game, a chat application, etc.).

Web browser 200 may operate by receiving input of a uniform resource locator (URL) via a field 202 from an input device (e.g., a pointing device, a keyboard, a touch screen, etc.). For example, the URL, http://www.example.org/weather.html, may be entered into field 202. Processor 112 may use the inputted URL to request data from a content source having a network address that corresponds to the entered URL. In other words, client 102 may request first-party content accessible at the inputted URL. In response to the request, the content source may return webpage data and/or other data to client 102. Web browser 200 may analyze the returned data and cause visual indicia to be displayed by electronic display 116 based on the data.

In general, webpage data may include text, hyperlinks, layout information, and other data that may be used to provide the framework for the visual layout of webpage 206. In some implementations, webpage data may be one or more files of webpage code written in a markup language, such as the hypertext markup language (HTML), extensible HTML (XHTML), extensible markup language (XML), or any other markup language. For example, the webpage data in FIG. 2 may include a file, "weather.html" provided by the website, "www.example.org." The webpage data may include data that specifies where indicia appear on webpage 206, such as text 208. In some implementations, the webpage data may also include additional URL information used by web browser 200 to retrieve additional indicia displayed on webpage 206. For example, the file, "weather.html," may also include one or more instructions used by processor 112 to retrieve images 210-216 from their respective content sources.

Web browser 200 may include a number of navigational controls associated with webpage 206. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of webpage 206 that are currently off-screen. For example, webpage 206 may be formatted to be larger than the screen of electronic display 116. In such a case, the one or more scroll bars 220 may be used to change the vertical and/or horizontal position of webpage 206 on electronic display 116.

Webpage 206 may be devoted to one or more topics. For example, webpage 206 may be devoted to the local weather forecast for Freeport, Me. In some implementations, a content selection server, such as content selection service 104, may analyze the contents of webpage 206 to identify one or more topics. For example, content selection service 104 may analyze text 208 and/or images 210-216 to identify webpage 206 as being devoted to weather forecasts. In some implementations, webpage data for webpage 206 may include metadata that identifies a topic.

In various implementations, content selection service 104 may select some or all of the content presented on webpage 206. For example, content selection service 104 may select third-party content 218 to be included on webpage 206, based on a user identifier associated with client 102. In some implementations, one or more content tags may be embedded into the code of webpage 206 that defines a content field located at the position of third-party content 218. Another content tag may cause web browser 200 to request additional content from content selection service 104, when webpage 206 is loaded. Such a request may include one or more keywords, a client identifier for client 102, or other data used by content selection service 104 to select content to be provided to client 102. In response, content selection service 104 may select third-party content 218.

Third-party content 218 may be selected based in part on an interest or product category identified by analyzing history data associated with a client identifier for client 102. For example, assume that the user of web browser 200 researched various makes and models of automobiles. Data regarding the research may be analyzed by content selection service 104 to identify automobiles as a potential interest category. Similarly, the history data regarding the research may be analyzed to identify a particular make and/or model of automobile, such as the Reptile by Quartz Motor Company (QMC). In some implementations, the interest category of automobiles may be included in an IC profile for the user identifier. Advertisers for automobiles may then compete in an auction to determine which advertiser is able to provide an advertisement to client 102. In further implementations, the product category relating to the QMC Reptile may be associated with the automobile-related interest category in the IC profile, or may be added to a separate product category (PC) profile. Thus, third-party content 218 may be provided on webpage 206 based on a potential interest of the user of client 102 (e.g., automobiles and/or the QMC Reptile), without regard to the actual topic of webpage 206 (e.g., a weather forecast).

In some implementations, content selection service 104 may provide third-party content 218 directly to client 102. In other implementations, content selection service 104 may send a command to client 102 that causes client 102 to retrieve third-party content 218. For example, the command may cause client 102 to retrieve third-party content 218 from a local memory, if third-party content 218 is already stored in memory 114, or from a networked content source. In this way, any number of different pieces of content may be placed in the location of third-party content 218 on webpage 206. In other words, one user that visits webpage 206 may be presented with third-party content 218 and a second user that visits webpage 206 may be presented with different content. Other forms of content (e.g., an image, text, an audio file, a video file, etc.) may be selected by content selection service 104 for display with webpage 206 in a manner similar to that of third-party content 218. In further implementations, content selected by content selection service 104 may be displayed outside of webpage 206. For example, content selected by content selection service 104 may be displayed in a separate window or tab of web browser 200, may be presented via another software application (e.g., a text editor, a media player, etc.), or may be downloaded to client 102 for later use.

Figure 3:
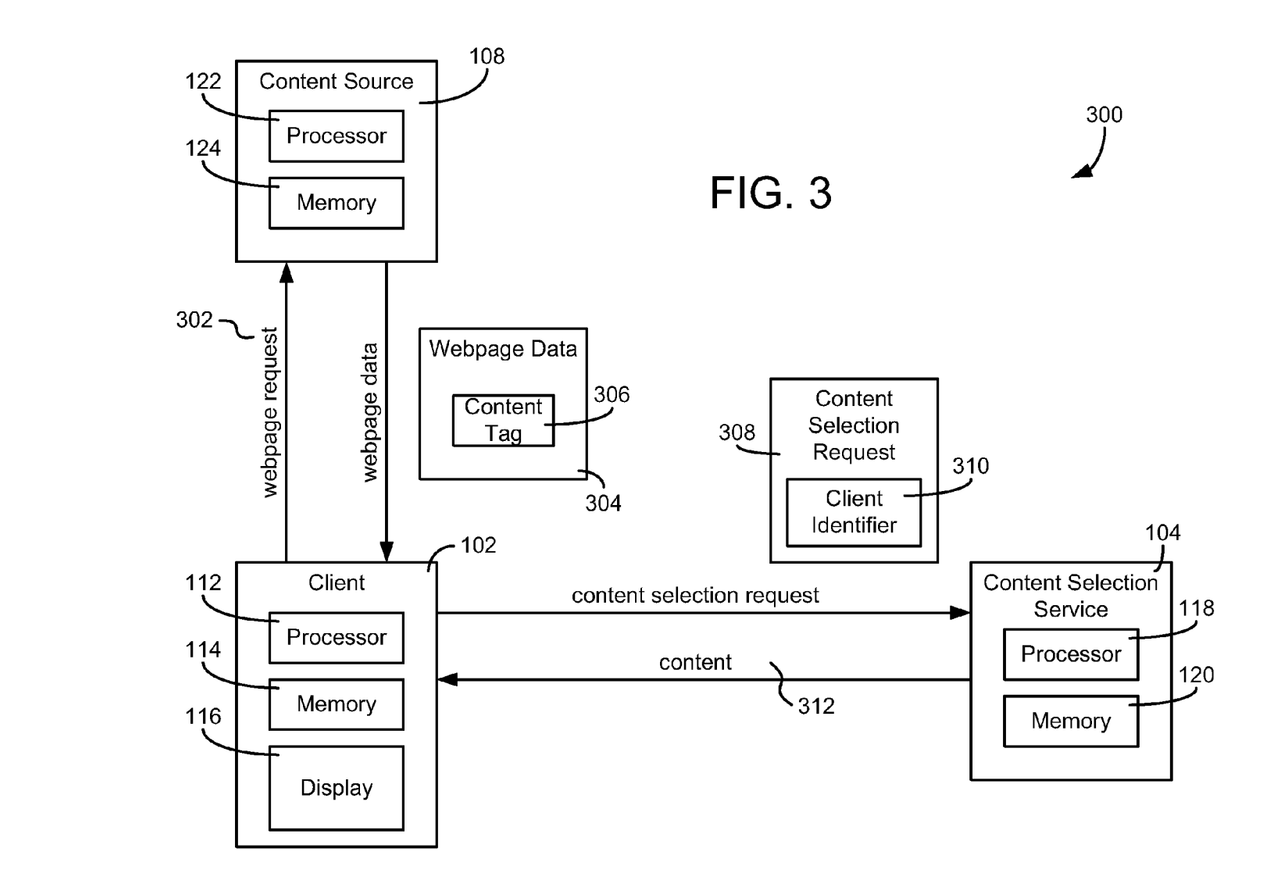
FIG. 3 is an example illustration of content being included with a webpage by a content selection server.

FIG. 3 is an example illustration of content 312 being selected by content selection service 104. As shown, client 102 may send a webpage request 302 to a content source via network 106, such as content source 108. For example, webpage request 302 may be a request that conforms to the hypertext transfer protocol (HTTP), such as the following:

GET /weather.html HTTP/1.1
Host: www.example.org

Such a request may include the name of the file to be retrieved, weather.html, as well as the network location of the file, www.example.org. In some cases, a network location may be an IP address or may be a domain name that resolves to an IP address of content source 108. In some implementations, a client identifier, such as a cookie associated with content source 108, may be included with webpage request 302 to identify client 102 to content source 108.

In response to receiving webpage request 302, content source 108 may return webpage data 304, such as the requested file, "weather.html." Webpage data 304 may be configured to cause client 102 to display a webpage on electronic display 116 when opened by a web browser application. In some cases, webpage data 304 may include code that causes client 102 to request additional files to be used as part of the displayed webpage. For example, webpage data 304 may include an HTML image tag of the form:

<img src="Monday_forecast.jpg">

Such code may cause client 102 to request the image file "Monday_forecast.jpg," from content source 108.

In some implementations, webpage data 304 may include content tag 306 configured to cause client 102 to retrieve an advertisement from content selection service 104. In some cases, content tag 306 may be an HTML image tag that includes the network location of content selection service 104. In other cases, content tag 306 may be implemented using a client-side scripting language, such as JavaScript. For example, content tag 306 may be of the form:

<script type='text/javascript'>
AdNetwork_RetrieveAd("argument")
</script> where AdNetwork_RetrieveAd is a script function that causes client 102 to send a content selection request 308 to content selection service 104. In various implementations, the argument of the script function may include the network address of content selection service 104, the referring webpage, and/or additional information that may be used by content selection service 104 to select content to be included with the webpage.

Content selection request 308 may include a client identifier 310, used by content selection service 104 to identify client 102. In various implementations, client identifier 310 may be an HTTP cookie previously set by content selection service 104 on client 102, the IP address of client 102, a unique device serial for client 102, other forms of identification information, or combinations thereof. For example, content selection service 104 may set a cookie that includes a unique string of characters on client 102 when content is first requested by client 102 from content selection service 104. Such a cookie may be included in subsequent content selection requests sent to content selection service 104 by client 102. According to various implementations, content selection service 104 may use client identifier 310 as a user identifier or associate client identifier 310 with a user identifier. For example, content selection service 104 may represent the user of client 102 as an HTTP cookie.

In some implementations, client identifier 310 may be used by content selection service 104 to store history data for client 102, with the permission of the user of client 102. For example, content selection request 308 may include data relating to which webpage was requested by client 102, when the webpage was requested, and/or other history data. Whenever client 102 visits a webpage that allows content selection service 104 to select content to appear in conjunction with the webpage, content selection service 104 may receive and store history data for client 102. In this way, content selection service 104 is able to reconstruct the online history of client 102 regarding webpages that utilize content selection service 104. In some implementations, content selection service 104 may also receive history data for client 102 from content sources that do not use its content selection services. For example, a website that does not use content selected by content selection service 104 may nonetheless provide information about client 102 visiting the website to content selection service 104, if the user has elected to receive third-party content selected by content selection service 104.

In some cases, client identifier 310 may be sent to content selection service 104 when a particular online event occurs. For example, webpage data 304 may include a content tag 306 that causes client 102 to send client identifier 310 to content selection service 104 when a displayed advertisement is clicked by the user of client 102. Client identifier 310 may also be used to record information after client 102 is redirected to another webpage. For example, client 102 may be redirected to an advertiser's website if the user selects a displayed advertisement. In such a case, client identifier 310 may also be used to record which actions were performed on the advertiser's website. For example, client identifier 310 may be sent to content selection service 104 as the user of client 102 navigates within the advertiser's website. In this way, data regarding whether the user searched for a product, added a product to a shopping cart, completed a purchase on the advertiser's website, etc., may also be recorded by content selection service 104.

Content selection service 104 may analyze history data associated with client identifier 310 to identify one or more interest categories and to generate an IC profile for the user identifier associated with client 102. Similarly, content selection service 104 may analyze the history data to identify one or more product categories, based on specific products or manufacturers mentioned on the visited webpages. For example, content selection request 308 may identify one or more themes of the webpage being requested (e.g., content tag 306 includes information regarding the theme of the webpage). In another example, content selection service 104 may perform text analysis and/or image analysis on the webpage to detect one or more themes of the webpage. In further implementations, the requested webpage may be a webpage of a search engine. In such a case, one or more search terms may be used by content selection service 104 to identify an interest or product category. According to some implementations, content selection service 104 may classify history data as being long-term, short-term, and/or current. The different types of history data may then be analyzed by content selection service 104 to identify long-term, short-term, and/or current interest or product categories. Content selection service 104 may use any identified categories to then generate an IC profile that includes one or more identified interest categories. In various implementations, an identified product category may be associated with a related interest category in the IC profile, or may itself be used to generate a separate PC profile. Such a profile may then be used by content selection service 104 to select content for client 102 based in part on the one or more interest or product categories in the profile.

In response to receiving content selection request 308, content selection service 104 may select content 312 to be returned to client 102 and included as part of the displayed webpage. For example, content selection service 104 may select content 312 based on one or more themes of the requested webpage (e.g., by content selection service 104 identifying keywords in the content of the webpage, themes included as part of content selection request 308, etc.). Content selection service 104 may also select content 312 using client identifier 310. In some implementations, content selection service 104 may match client identifier 310 to an IC or PC profile. If a topic of content 312 is related to an interest or product category in the associated profile, content selection service 104 may select 312 to be provided to client 102.

In some cases, content selection service 104 may be configured to run a content auction in which third-party content providers, such as advertisers, compete to provide content to client 102. For example, if the profile for the user identifier associated with client 102 includes the interest category of airline tickets to Seattle, an advertiser that sells airline tickets may bid in such an auction to provide an advertisement to client 102. In response to receiving content 312, client 102 may then embed the advertisement into the webpage displayed by electronic display 116. In some implementations, content selection service 104 may instead select an advertisement already stored on client 102 and provide an indication of the selection to client 102. In response, client 102 may retrieve the pre-stored advertisement from memory 114 and display the advertisement as part of the displayed webpage.

Figure 4:
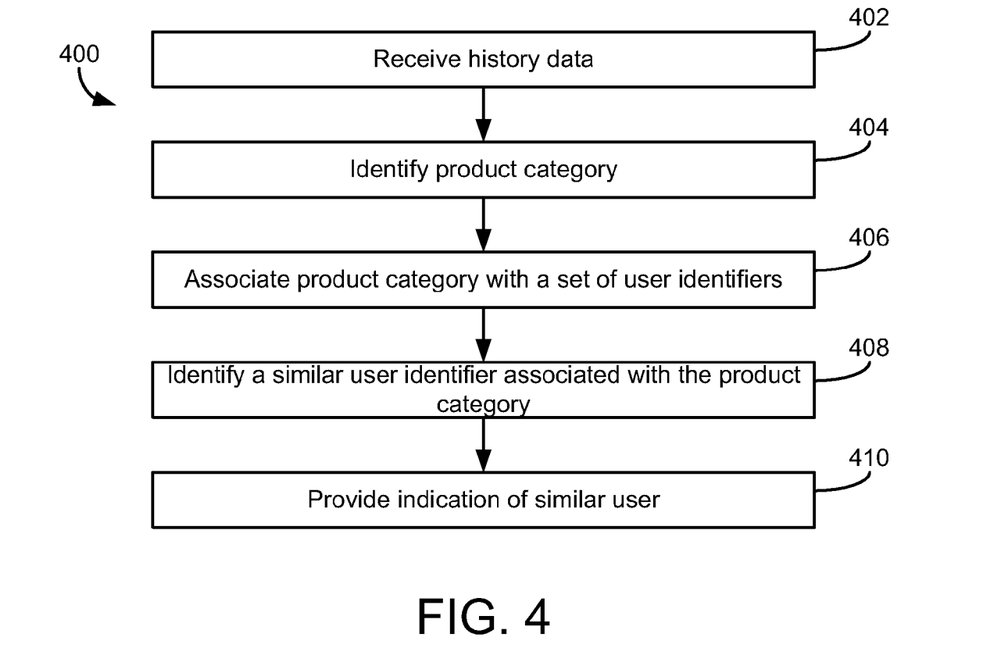
FIG. 4 is an example process for identifying a similar user identifier, according to various implementations.

Referring now to FIG. 4, an example process 400 for identifying a similar user identifier is shown, according to various implementations. Process 400 may be performed by one or more processing circuits, such as a processing circuit of a content selection service. In general, process 400 allows a specified set of user identifiers to be used to identify a similar user identifier. One or more product categories may be associated with the user identifiers in the set and used to determine whether another user identifier is similar.

Process 400 includes receiving history data associated with a set of user identifiers (block 402). In some implementations, the history data may be indicative of webpages visited by the user identifiers, if their corresponding users have elected to allow this type of information to be used. For example, the history data may include the address of a visited webpage and a timestamp of when the webpage was visited. In some implementations, the history data may also include one or more self-reported product or interest categories for the webpages. For example, metadata of a webpage may identify the webpage as being devoted to a particular topic or product.

The history data may be received from any number of different sources. In some embodiments, the history data may be received from a visited website. For example, a website may provide a list of user identifiers that visited the website to a content selection service. In other embodiments, the content selection service may receive an indication of a webpage visit as part of a content request. For example, a webpage that uses the content selection service may have an embedded content tag that causes a client device to request third-party content from the selection service. In response to receiving the request, the service may store data regarding the first-party webpage, the time of the request, and a user identifier associated with the request. For example, the content selection service may create a database entry regarding the webpage visit and retrieve the history data at a later time.

Process 400 includes identifying a product category using the history data (block 404). As used herein, a product category refers to a specific product. For example, a product entity may correspond to the "4G Supremo" mobile phone manufactured by "Armadillo Mobile Devices." The product entity may include information about the product, such as the product's name, manufacturer, locations at which the product is available, release version, model number, or any other information that may be used to distinguish the product from other products. In one implementation, a product entity may correspond to a particular service, instead of a product.

A product category may be identified by using text and/or image recognition on a visited webpage. For example, text recognition may be used on a webpage to recognize the product "4G Supremo." In such a case, a product category corresponding to the product may be identified. In some implementations, a product category may be associated with multiple words and phrases that may be recognized on a webpage. For example, the product category for the 4G Supremo may also be associated with variations of "4G Supremo," such as misspellings, slang terms, different languages, etc. Similarly, image recognition may be used to detect an image of the 4G Supremo on a webpage. In one implementation, the URL of a webpage may also be analyzed to identify a product category for the webpage. For example, the URL www.4GSupremoReviews.test may be analyzed to determine that the webpage is devoted to the product category. Other data that may be analyzed to identify a product category includes metadata of the webpage (e.g., webpage data that is not actually displayed by a client device) and data part of a content tag (e.g., a request for third-party content may include an indicated product category).

In some implementations, an interest category may also be identified based on history data. Similar to a product category, an interest category may be identified using text or image recognition on a visited webpage, based on a webpage's metadata, based on an interest category sent as part of a third-party content request (e.g., within a content tag on a first-party webpage), based on the webpage's URL, etc. In one implementation, interest categories may be categorized using a hierarchical taxonomy. For example, an interest category related to cellular telephones may be /Electronics/Mobile Devices/Cellular Telephones.

A product category may be implemented in conjunction with interest categories or may be a stand-alone category. In one implementation, a product category may be a label that may be attached to one or more interest categories. Exemplary product category labels may include, but are not limited to, a brand label, a model label, and a product group label. For example, the following interest categories may have associated product category labels:
/Hobbies & Leisure/Photo & Video/Digital Cameras+brand: Bob's Cameras
/Electronics/Cameras/Digital Cameras+brand:Bob's Cameras+model:X7
/Hobbies & Leisure/Photo & Video+product_group: cameras+brand: Bob's Cameras
In the above examples, the product category labels may be applied to the various levels of the interest category hierarchies. In one implementation, a product_group label may be applied to a higher-level interest category. For example, a product_group label may be associated with any interest category that does not correspond to a particular type of product (e.g., cameras, cellular phones, etc.). A product category label may also be applied to multiple interest categories. For example, a user may be interested in photography as a hobby, or may be shopping for a digital camera to give as a gift. In such a case, a digital-camera related product category label may be applied to either or both of the photography-related and digital camera-related interest categories.

In other implementations, a product category may be independent of any interest categories, if interest categories are also identified. In one implementation, a product category may be part of a product category taxonomy. For example, one possible product category is /Consumer Products/Electronics/Manufacturers/Bob's Cameras/Models/X7. In another implementation, a product category may be a label or other identifier that may be associated directly with a user identifier (e.g., without being associated with an interest category). For example, the product category regarding the X7 camera from Bob's Cameras may have a unique identifier in a database of 777. In such a case, a database table entry may be created containing both a user identifier and '777' for the product category, to associate the two.

Process 400 includes associating a product category with a set of user identifiers (block 406). Product and/or interest categories associated with a user identifier in the set may be part of the identifier's profile, such as an IC or PC profile. Such a profile generally represents topics and products that may be of interest to the user identifier. In some cases, any number of identified product category may be associated with a user identifier. In other cases, a limit may be placed on the number of possible product categories associated with a user identifier. For example, a user identifier may be limited to the top ten product categories. Similarly, a user identifier may be associated with a limited or unlimited number of identified interest categories, in various implementations. In various implementations, the set of user identifiers may be selected based on one or more online actions performed by the user identifiers. For example, the user identifiers in the set may be associated with online purchases may at an online retailer's website. In some cases, the purchased products may even be unrelated to the product category associated with the purchased product. For example, assume that users that purchased handmade soap from an online retailer are also interested in the 4G Supremo phone. In such a case, other users interested in the 4G Supremo phone may also be interested in purchasing handmade soap, even though the two products are unrelated.

A product or interest category identified using the history data may be given a weighting, to determine which categories are to be associated with a user identifier. A weighting may be based in part on the number or frequency of visits by the user identifier to webpages devoted to the category, when the user identifier last visited a webpage devoted to the category, or how frequently the topic of the category is mentioned on the webpage. For example, a user identifier that searched once for digital cameras may not really be interested in digital cameras or a particular model of camera. However, if the user identifier searched twenty times for digital cameras, this may be a good indication that its corresponding user is interested in digital cameras. In such a case, the digital camera-related interest category may receive a higher weighting and included in an IC profile for the user identifier. In another example, a webpage may only mention a product in passing. For example, a webpage may include a statement that the X7 from Bob's Cameras is much better than the Dgix camera from John's Devices. While the Dgix camera also appears on the webpage, it may receive a lower weighting than the X7, since it is mentioned less.

In one example, assume that a user identifier visited several webpages devoted to the X7 camera from Bob's Cameras and the Dgix camera from John's Devices. Also assume that the X7 camera appeared with a frequency of 85% on the visited webpages. Among webpages that mentioned both products, the X7 may also appear 75% more frequently than the Dgix camera. In such a case, the product category corresponding to the X7 may receive a higher weighting than the Dgix camera and associated with the user's identifier based on the weighting.

According to various implementations, the product or interest categories associated with the individual user identifiers in the set may be analyzed to determine which categories are to be associated with the set as a whole. In some implementations, only a product or interest category identified for a high number or percentage of the set of user identifiers may be associated with the set as a whole. For example, assume that only a small percentage (e.g., less than twenty percent, less than ten percent, less than five percent, etc.) of the set are associated with a product category related to the X7 camera from Bob's Cameras. In such a case, the product category may not reflect the overall intentions and interests of the set. Therefore, the product category may not be associated with the set as a whole or used to identify one or more similar user identifiers.

In some implementations, a product or interest category may be associated with the set based on a threshold number or percentage of the identifiers in the set having that category. For example, a category may only be associated with the set as a whole if more than 25% of the user identifiers in the set are associated with the category. In other implementations, the n-number of categories associated with the highest percentage or number of identifiers in the set may be associated with the set as a whole. For example, only the top three product categories associated with the highest number of user identifiers in the set may be associated with the set as a whole.

In further implementations, a weighting may be applied to each product or interest category to determine whether the category is to be associated with the set as a whole. Such a weighting may be based on, for example, the number or percentage of identifiers in the set associated with the category and/or the category's weights used to associate the category with the individual user identifiers. For example, assume that 25% of the user identifiers in the set are associated with the product category related to the X7 camera. Also, assume that the average user identifier associated with the X7 camera product category visited ten websites devoted to the product. In addition, assume that 10% of the user identifiers are associated with a product category for the Dgix camera with an average of five visits to webpages devoted to the product. In such a case, the product category related to the X7 camera may receive a higher weighting than the product category related to the Dgix camera. If the weighting is above a threshold value, or if the weighting is one of the top weighted categories for the set, it may be associated with the set as a whole and used to identify one or more similar user identifiers that are outside of the set.

Process 400 includes identifying a similar user identifier associated with the product category associated with the set (block 408). A product category may be identified and associated with a user identifier outside of the set in a similar manner as those in the set (e.g., by analyzing webpages visited by the user identifier). In one implementation, a user identifier may be determined to be similar to those in the set based on a simple matching of associated product categories. For example, a user identifier associated with the product category related to the X7 camera may be determined to be similar to the set, if the set of user identifiers is also associated with the X7 product category. In a further implementation, the weightings used to associate the product category with the user identifiers in the set may also be used to determine similarity. For example, a user identifier may be considered similar to those in the set, if its associated product category has a weighting near the average of those in the set.

In implementations in which a product category is a label for an interest category, a similarity weighting value may also be used to identify a similar user identifier. In one implementation, the similarity determination may be based in part on the relative distance between an interest category associated with a user identifier and interest categories associated with the set. For example, assume that the user identifier under analysis is associated with the following interest and product categories:
/Hobbies & Leisure/Photo & Video+product group: cameras+brand: Bob's Cameras
Also, assume that the user identifiers in the set are associated with the following interest and product categories:
/Hobbies & Leisure/Photo & Video/Digital Cameras+brand: Bob's Cameras
Thus, both the user identifier under analysis and those in the set may be associated with the product category relating to Bob's Cameras. However, since the user identifier is only associated with the more general interest category of Photo & Video and those in the set are associated with the more specific interest category of Digital Cameras, the user identifier's similarity score may be lower than if both groups had the same interest category. In one implementation, a similarity score may be compared to a threshold value to determine whether the user identifier is similar to those in the set. In another implementation, the top n-number of user identifiers having the highest similarity scores may be identified as being similar user identifiers (e.g., a set of multiple similar user identifiers may be determined).

Process 400 may include providing an indication of the similar user (block 410). In one implementation, the similar user identifier may be provided to a device of a third-party content provider. For example, a third-party content provider may be presented with the actual user identifier or may be provided with data regarding any identified similar user identifiers (e.g., the number of identified similar user identifiers, etc.). In some implementations, an identified similar user identifier may be used in a content auction. For example, if the similar user identifier visits a webpage that uses a content selection service to selection third-party content, a third-party content provider may place a bid in the content auction for the ability to provide content to the user identifier. In one implementation, the bid may be based on how similar the user identifier is to the set of user identifiers. In other words, a bid in a content auction may be based in part on the user identifier's similarity score with the other identifiers in the set.

Figure 5:
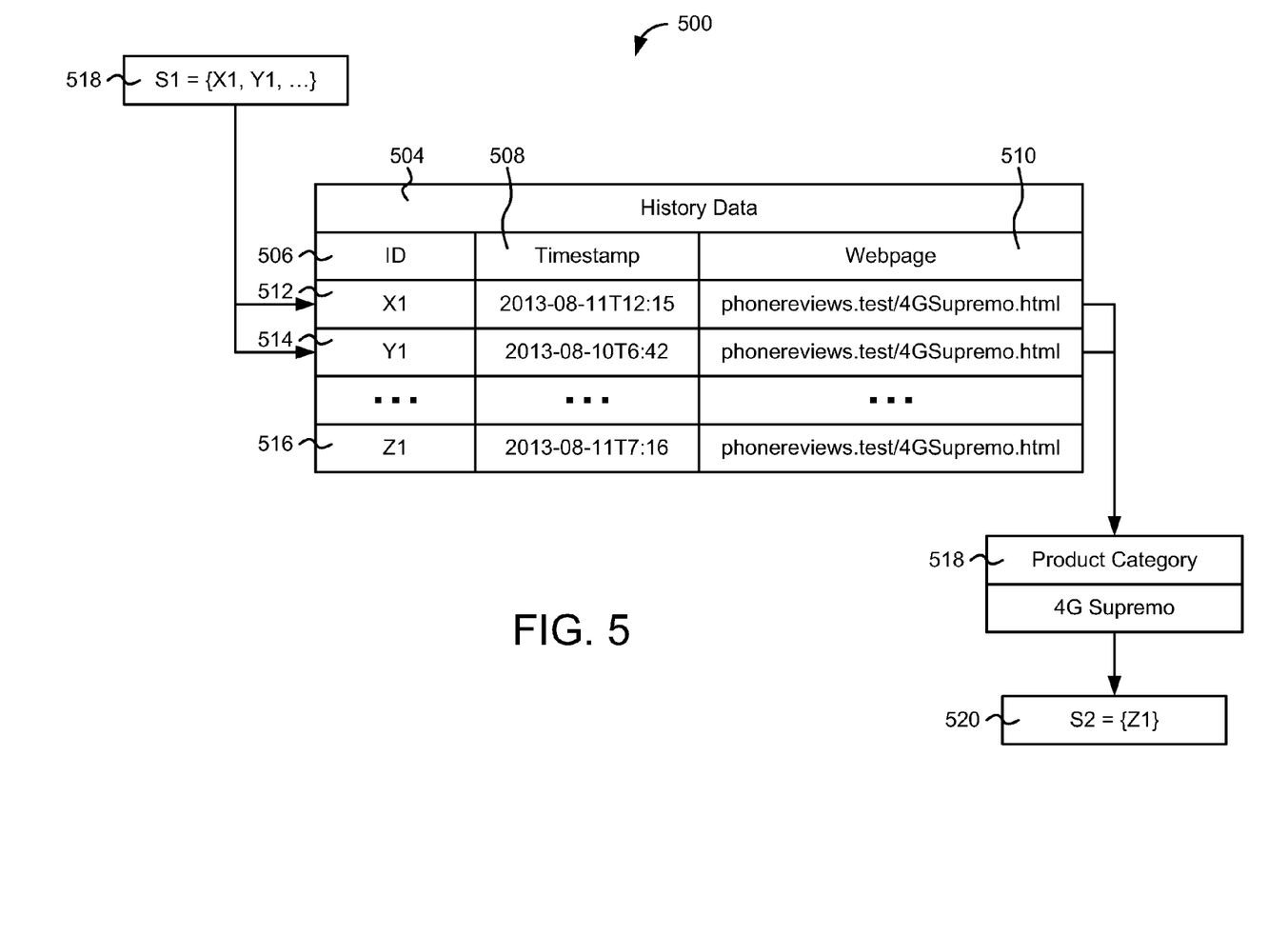
FIG. 5 is an illustration of a product category being used to identify a similar user identifier, in accordance with one example implementation.

Referring now to FIG. 5, an illustration 500 of a product category being used to identify a similar user identifier is shown, in accordance with one example implementation. In general, illustration 500 depicts one potential implementation in which a set 502 of user identifiers is used to identify a set 520 of one or more similar user identifiers. A product category 518 associated with both sets 502, 520 may be used as part of the similarity determination.

Set 502 may be specified or provided by a third-party content provider. For example, set 502 may be specified by a content provider that operates a website devoted to protecting the habitat of the giant panda. Set 502 may include user identifiers for users that have elected to allow a content selection service select third-party content for the users. The user identifiers in set 502 also may be associated with one or more online actions. For example, set 502 may include user identifiers that signed up for a monthly newsletter regarding the panda habitat conservation efforts.

Set 502 may include any number of user identifiers, such as user identifier 512 and user identifier 514 (e.g., a first user identifier, a second user identifier, etc.). User identifiers 512-514 may be used to retrieve history data regarding webpages visited by user identifier 512-514. History data 504 may be stored, for example, in a database table that includes a first column 506 for user identifiers, a second column 508 for timestamps, and a third column 510 for visited webpages. Thus, a user identifier in column 506 may be associated with a visit to a webpage in column 510 at a time indicated by the timestamp in column 508. For example, history data 504 indicates that user identifier 512 visited the webpage, phonereviews.test/4GSupremo.html on Aug. 11, 2013 at 12:15 PM. While a single database table is depicted in illustration 500, any number of database tables may be used, in other implementations. Further, the database tables may also include any number of columns and rows to store other forms of data regarding the user identifiers.

History data 504 may also include data regarding webpages visited by other user identifiers outside of set 502. As shown, history data 504 may include history data for user identifier 516, which is not in set 502. For example, history data 504 may include data that indicates that user identifier 516 visited phonereviews.test/4GSupremo.html on Aug. 11, 2013 at 7:16 AM.

Based on the webpage visits indicated by history data 504, user identifiers may be associated with product category 518 for the 4G Supremo, a particular model of cellular telephone. For example, the webpage located at phonereviews.test/

4GSupremo.html may be analyzed using text or image analysis, to determine that the visited webpage relates to product category 518. In some implementations, product category 518 may be associated with a user identifier in column 506 of history data 504 based on the identifier's entries in columns 508-510. For example, a weighting may be determined based on the number of visits to webpages in column 510 regarding product category 518. The weighting may also be based in part on how recently such a webpage was visited by a user identifier and/or how frequently the user identifier visits webpages regarding product category 518.

As shown, set 520 may contain one or more user identifiers determined to be similar to those in set 502. For example, set 520 may include user identifier 516 based on user identifier 516 and those in set 502 being associated with product category 518. Since user identifier 516 and those in set 502 are both associated with product category 518, their represented users are likely interested in the 4G Supremo. Moreover, the user represented by user identifier 516 may also be interested in signing up for the provider's newsletter. The third-party content provider that specified set 502 may then use set 520 the users represented by the identifiers in the set to also sign up for the newsletter (e.g., by providing an invitation with first-party content to the user identifiers in set 520).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computerized method for identifying a similar user identifier comprising:
   receiving, at a processing circuit, history data indicative of webpages visited by a set of user identifiers;
   analyzing, by the processing circuit, the history data to identify a product category based in part on a topic of the webpages, the product category corresponding to a specific manufacturer or a specific product from the manufacturer;
   associating, by the processing circuit, the product category with the user identifiers in the set;
   identifying, by the processing circuit, a user identifier as being a similar user identifier to the user identifiers in the set based in part on a product category associated with the user identifier and based in part on the product category associated with the user identifiers in the set; and
   providing, by the processing circuit, an indication of the similar user identifier.

2. The method of claim 1, wherein the similar user identifier is identified based in part on its product category matching the product category associated with the user identifiers in the set.

3. The method of claim 1, further comprising:
   generating, by the processing circuit, a similarity weight representing the similarity between the product category associated with the user identifier and the product category associated with the user identifiers in the set, wherein the similar user identifier is identified based in part on the similarity weight.

4. The method of claim 1, further comprising:
   analyzing, by the processing circuit, the history data to identify an interest category based in part on a topic of the webpages; and
   associating, by the processing circuit, the interest category with the user identifiers in the set, wherein the similar user identifier is identified based in part on an interest category associated with the user identifier and the interest category associated with the user identifiers in the set.

5. The method of claim 4, wherein the product category associated with the user identifiers in the set comprises a label for the interest category associated with the user identifiers in the set.

6. The method of claim 1, further comprising:
selecting content based in part on the set of user identifiers; and
providing the selected content to a device associated with the similar user identifier.

7. The method of claim 1, wherein the set of user identifiers is selected based in part on online purchases of products made by the user identifiers, the purchased products differing from the specific product of the product category.

8. A system for identifying a similar user identifier comprising a processing circuit operable to:
receive history data indicative of webpages visited by a set of user identifiers;
analyze the history data to identify a product category based in part on a topic of the webpages, the product category corresponding to a specific manufacturer or a specific product from the manufacturer;
associate the product category with the user identifiers in the set;
identify a user identifier as being a similar user identifier to the user identifiers in the set based in part on a product category associated with the user identifier and based in part on the product category associated with the user identifiers in the set; and
provide an indication of the similar user identifier.

9. The system of claim 8, wherein the similar user identifier is identified based in part on its product category matching the product category associated with the user identifiers in the set.

10. The system of claim 8, wherein the processing circuit is further operable to:
generate a similarity weight representing the similarity between the product category associated with the user identifier and the product category associated with the user identifiers in the set, wherein the similar user identifier is identified based in part on the similarity weight.

11. The system of claim 8, wherein the processing circuit is further operable to:
analyze the history data to identify an interest category based in part on a topic of the webpages; and
associate the interest category with the user identifiers in the set, wherein the similar user identifier is identified based in part on an interest category associated with the user identifier and the interest category associated with the user identifiers in the set.

12. The system of claim 11, wherein the product category associated with the user identifiers in the set comprises a label for the interest category associated with the user identifiers in the set.

13. The system of claim 8, wherein the processing circuit is further operable to:

select content based in part on the set of user identifiers; and
provide the selected content to a device associated with the similar user identifier.

14. The system of claim 8, wherein the set of user identifiers is selected based in part on online purchases of products made by the user identifiers, the purchased products differing from the specific product of the product category.

15. A non-transitory computer-readable storage medium having machine instructions stored therein, the instructions being executable by a processor to cause the processor to perform operations comprising:
receiving history data indicative of webpages visited by a set of user identifiers;
analyzing the history data to identify a product category based in part on a topic of the webpages, the product category corresponding to a specific manufacturer or a specific product from the manufacturer;
associating the product category with the user identifiers in the set;
identifying a user identifier as being a similar user identifier to the user identifiers in the set based in part on a product category associated with the user identifier and based in part on the product category associated with the user identifiers in the set; and
providing an indication of the similar user identifier.

16. The non-transitory computer-readable storage medium of claim 15, wherein the similar user identifier is identified based in part on its product category matching the product category associated with the user identifiers in the set.

17. The non-transitory computer-readable storage medium of claim 15, wherein the operations further comprise:
generating a similarity weight representing the similarity between the product category associated with the user identifier and the product category associated with the user identifiers in the set, wherein the similar user identifier is identified based in part on the similarity weight.

18. The non-transitory computer-readable storage medium of claim 15, wherein the operations further comprise:
analyzing the history data to identify an interest category based in part on a topic of the webpages; and
associating the interest category with the user identifiers in the set, wherein the similar user identifier is identified based in part on an interest category associated with the user identifier and the interest category associated with the user identifiers in the set.

19. The non-transitory computer-readable storage medium of claim 18, wherein the operations further comprise: wherein the product category associated with the user identifiers in the set comprises a label for the interest category associated with the user identifiers in the set.

20. The non-transitory computer-readable storage medium of claim 15, wherein the set of user identifiers is selected based in part on online purchases of products made by the user identifiers, the purchased products differing from the specific product of the product category.

* * * * *